United States Patent
Krahn et al.

(10) Patent No.: US 6,303,224 B1
(45) Date of Patent: *Oct. 16, 2001

(54) METHOD FOR ATTACHING A FLUORIDE-BASED POLYMER LAYER TO A POLYPHENYLENE ETHER OR POLYSTYRENE LAYER, AND RELATED ARTICLES

(75) Inventors: John R. Krahn; Herbert Shin-I Chao, both of Schenectady, NY (US)

(73) Assignees: General Electric Co.; Elf Atochem North America, Inc.; Elf Autochem S.A., Pittsfield, all of MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,760

(22) Filed: Jun. 3, 1998

(51) Int. Cl.[7] .......................... B32B 27/08; B32B 27/18; B32B 27/28; B32B 27/30
(52) U.S. Cl. .................... 428/407; 428/411.1; 428/421; 428/500; 428/521; 428/522
(58) Field of Search .................................. 525/227, 228; 428/421, 411.1, 500, 521, 522, 407; 526/319, 317.1, 318.25, 318.4, 318.45, 329.2, 329.7, 347

(56) References Cited

U.S. PATENT DOCUMENTS

| 3,968,196 | | 7/1976 | Wiley | 264/171 |
|---|---|---|---|---|
| 4,007,311 | * | 2/1977 | Harlan, Jr. | 428/246 |
| 4,317,860 | | 3/1982 | Strassel | 428/421 |
| 4,364,886 | | 12/1982 | Strassel | 264/171 |
| 4,415,519 | | 11/1983 | Strassel | 264/171 |
| 4,444,826 | | 4/1984 | Sasaki et al. | 428/216 |
| 4,563,393 | * | 1/1986 | Kitagawa et al. | 428/412 |
| 4,585,701 | | 4/1986 | Bartoszek et al. | 428/421 |
| 4,945,006 | * | 7/1990 | Muggee et al. | 428/500 |
| 4,948,641 | | 8/1990 | Shantz et al. | 428/35.7 |
| 5,096,782 | | 3/1992 | Dehennau et al. | 428/412 |
| 5,112,692 | | 5/1992 | Strassel et al. | 428/421 |
| 5,242,976 | | 9/1993 | Strassel et al. | 525/72 |
| 5,470,930 | * | 11/1995 | Toba et al. | 526/204 |
| 6,136,441 | * | 10/2000 | MacGregor et al. | 428/412 |

FOREIGN PATENT DOCUMENTS

| 0 245 139 A1 | 4/1987 | (EP) . |
|---|---|---|
| 0 857 758 A1 | 8/1988 | (EP) . |
| 62048547 | 3/1987 | (JP) . |
| 1200958 | 8/1989 | (JP) . |
| 1314166 | 12/1989 | (JP) . |
| 2051934 | 2/1990 | (JP) . |
| 2151428 | 6/1990 | (JP) . |
| 2151437 | 6/1990 | (JP) . |

OTHER PUBLICATIONS

Written Opinion, International application No. PCT/US99/09444 (5 pages) (Jan. 1994).
Molecular Design of Multicomponent Polymer Systems. X. by T. Ouhadi et al. Pub. Journal of Polymer Science vol. 24, 973–981 (1986).
Long Life Coatings with PVD Polymers by E.J. Bartoszek et al., Pub. Surface Coatings International 1995 (9).
Compatibilization of PVDF/PS Blends with Styrene & Methyl Methacrylate Random & Blockcopolymers by Denise Freitas Siqueira et al., Pub. Polym. Networks Blends 3 (1), 45–50 (1993).
Adhesion and morphology of PVDF/PMMA & compatibilized PVDF/PS interfaces, by D. Freitas Siqueira et al., Pub. Polymer 1991, vol. 32 No. 6, p. 990–998.
Thermal Transitions, Microstructure & Miscibility in Ternary Polyblends Based on Poly(vinylidene Fluoride) by Carmen del Rio et al., Pub. Polymer International 0959–8103/92/$05.00 1992 p. 47–53.
Reinforcement of Polymer Interfaces with Random Copolymers by Chi–An Dai, et al., Physical Review Letters, vol. 73, No. 18, Oct. 31, 1994—p. 2472–2474.
Property–Morphology Relatinships of Polymethylmethacrylate/Polyvinylidenefluoride Blends by Jovan Mijovic et al., Pub. Polymer Engineering and Science, Mar. 1982, vol. 22, No. 4—p. 234–240.
Polmer Blends (or Alloys), by D.R. Paul et al., Published J. Macrmol. Sci.–Rev. Macromol. Chem., C18(1), 109–168 (1980), pp. 109–169.
Compatibilization of poly(2,6–dimethyl 1–1, 4–phenylene ether) poly(vinylidene difluoride) blends by F.J. Viersen et al., pubHuthig & Wepf Verlag, Basel '93, p.–111–119.

* cited by examiner

Primary Examiner—Paul Thibodeau
Assistant Examiner—Ramsey Zacharia

(57) ABSTRACT

This invention is directed to a tie layer for improving the adhesion of a layer of a fluoride-based polymeric material to a layer of a polyphenylene ether- or polystyrene-based material. The tie layer comprises a copolymer of a styrenic material like high impact polystyrene, and an acrylic material such as poly(methyl methacrylate) (PMMA). The tie layer composition may further include at least one flexibilizing agent which is compatible with one of the materials in the other layers. Exemplary flexibilizing agents are blends or copolymers which comprise rubber and polystyrene, or core-shell impact modifiers, or combinations of these types of materials. The layers can be coextruded or laminated, using conventional techniques.

34 Claims, 1 Drawing Sheet

METHOD FOR ATTACHING A FLUORIDE-BASED POLYMER LAYER TO A POLYPHENYLENE ETHER OR POLYSTYRENE LAYER, AND RELATED ARTICLES

CROSS-REFERENCE TO RELATED APPLICATIONS

Not Applicable

STATEMENT REGARDING FEDERALLY FUNDED RESEARCH

Not Applicable

FIELD OF THE INVENTION

This invention relates generally to polyphenylene ether and polystyrene polymers, and related articles. More particularly, it concerns the use of protective layers for polyphenylene ether or polystyrene-based articles, and to methods for attaching such layers.

BACKGROUND OF THE INVENTION

Polymer compositions based on polystyrene resins or polyphenylene ether (PPE) resins are commercially attractive materials. Many polystyrenes, for example, are characterized by high strength, impact resistance, and insulating capacity—both thermal and electrical. They are used for appliances, food containers, packaging, and for many other products.

PPE resins also have a wide variety of desirable attributes. They possess good chemical and physical properties, such as impact strength, hydrolytic stability, and high temperature-resistance. Moreover, they can be easily formed into films, fibers, and molded articles. One of the most popular compositions of this type is based on a blend of PPE with various types of styrene resins, such as rubber-modified, "high impact styrene".

Despite their many attributes, PPE compositions and polystyrene compositions are sometimes unsuitable for exterior applications, such as an outdoor environment. The "weatherability" of articles based on these materials is not always at an acceptable level, since the materials tend to exhibit yellowing when exposed to ultraviolet light. In addition to the discoloration, the yellowing can in turn act as the source of cracks which can weaken or permanently damage the article. PPE articles are therefore sometimes painted to shield them from UV sources.

Other techniques could be used to provide weatherability for PPE or polystyrene articles. For example, a thin layer of a weatherable material such as poly(vinylidene fluoride) (PVDF) could be applied to the surface of the article. In this manner, the article would continue to possess the desirable properties of the base material (i.e., the PPE or polystyrene), while also exhibiting the characteristics often required for an outdoor environment. As an example, U.S. Pat. No. 4,563,393 (Kitigawa et al) describes the use of a layer of a vinylidene fluoride resin to protect a layer of a thermoplastic resin such as PPE or polycarbonate from the forces of an outdoor environment. Similarly, it may sometimes be desirable to apply a layer of a PVDF-type material to a base layer of polystyrene, for weatherability or some other purpose.

It is usually critical that the protective layer adhere very tightly to the base layer. In the case of layers formed from chemically dissimilar polymers like PVDF with either PPE or polystyrene, satisfactory adhesion between the layers is not easily obtained. The Kitigawa et al invention relies on the use of polymerized units of an ethylenic unsaturated carboxylic acid ester to improve adhesion between the vinylidene resin and the thermoplastic base layer. The carboxylic acid ester units can be in the form of a copolymer-constituent of the base layer polymer, as an example.

There continues to be a need for additional techniques for improving the adhesion between a base layer of a PPE-based or polystyrene-based material, and an overlying layer (e.g., a protective layer) made from a material which is normally incompatible with PPE and polystyrene, such as a fluoride-based polymer. The adhesion should be strong enough to prevent any substantial peeling of the protective layer during rigorous conditions of use, e.g., in an outdoor environment exposed to a considerable amount of UV light. Moreover, the technique should be cost-effective and relatively simple to utilize in a larger-scale, industrial fabrication setting, such as a commercial molding facility. Furthermore, the adhesion technique should not adversely affect any of the desired properties for the completed article, e.g., the impact strength of a PPE/styrene base layer composition, or the weather-ability of the protective layer.

SUMMARY OF THE INVENTION

The needs cited above have been met by the discoveries upon which the present invention is based. One embodiment of this invention is directed to a tie layer for improving the adhesion of a layer of a fluoride-based polymeric material to a layer of a polyphenylene ether-based material or a polystyrene-based material. The tie layer comprises a copolymer of a styrenic material like high impact polystyrene, and an acrylic material which is compatible with the fluoride-based polymer, such as poly(methyl methacrylate) (PMMA). In preferred embodiments, the copolymer is of the graft- or block-type, and comprises at least about 40% by weight styrenic material.

In some of the preferred embodiments, the tie layer composition further comprises at least one flexibilizing agent which is compatible with the fluoride-based polymeric material or the PPE/polystyrene-based material. Exemplary flexibilizing agents are blends or copolymers which comprise rubber and polystyrene, or core-shell impact modifiers, or combinations of these types of materials.

The tie layer can be coextruded with the other two layers by conventional methods. The resulting adhesion of the fluoride-based layer to the PPE or polystyrene layer (through the tie layer) is very high, as demonstrated by peel-strength evaluation. Moreover, these multi-layer articles continue to display all of the desirable attributes of both the base layer material and the fluoride-based material.

Another aspect of the present invention relates to a method for improving the adhesion of a fluoride-based polymer layer to a PPE or polystyrene-based polymer layer. The method comprises situating a tie layer between the two primary layers, wherein the tie layer comprises a copolymer of a styrenic material like high impact polystyrene, and an acrylic material such as poly(methyl methacrylate) (PMMA). The tie layer composition often contains at least one flexibilizing agent, as mentioned above. In preferred embodiments, all of the layers are coextruded or laminated together by conventional techniques.

Still another embodiment of the invention is directed to an article which comprises:
 a) a fluoride-based polymer layer;
 b) a polyphenylene ether-based or polystyrene-based polymer layer; and c) a tie layer disposed between layer (a) and layer (b), having a composition as described herein.

Exemplary articles include various types of roofing panels, shingles, and similar types of structures used outdoors, such as canopies.

Other details regarding this invention are comprehensively provided in the sections which follow.

DETAILED DESCRIPTION OF THE INVENTION

Figure 1:
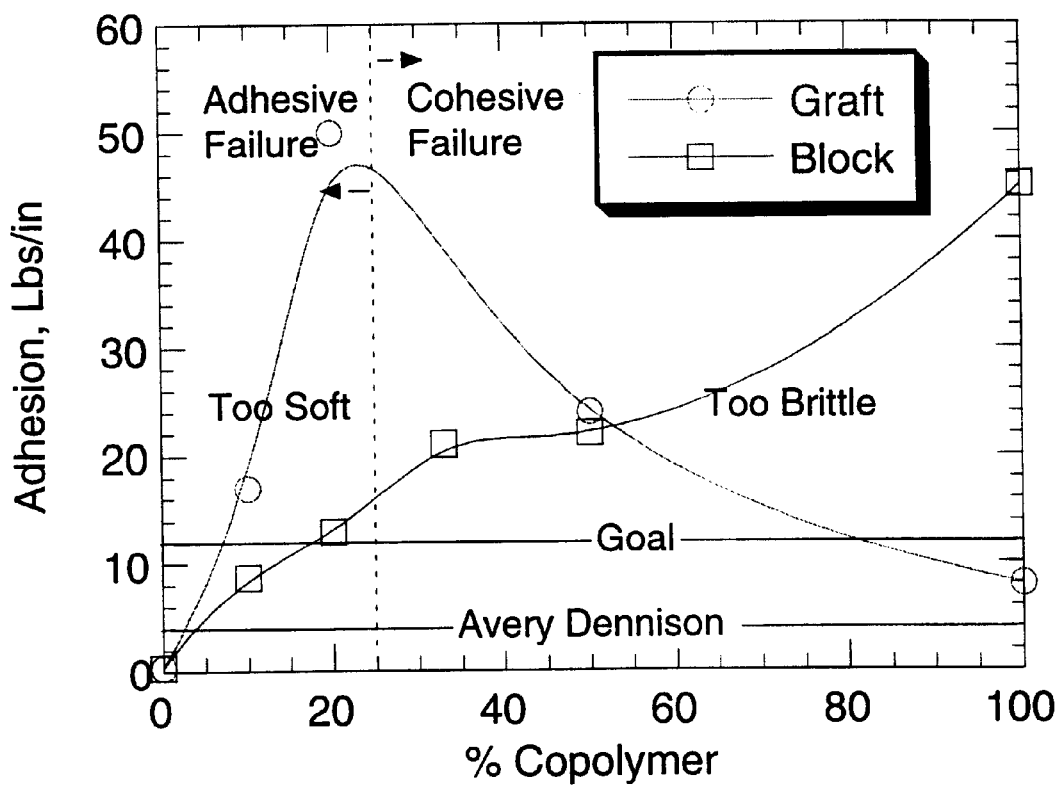
FIG. 1 is a graph which depicts adhesion characteristics as a function of the copolymer concentration in a tie layer between a PPE layer and a PVDF layer, as further described below.

As mentioned above, the tie layer for the present invention comprises a copolymer of an acrylic material and a styrenic material. A wide variety of acrylic materials may be employed, as long as they are physically and chemically compatible with the fluoride-based polymeric material. Common acrylic materials such as polyacrylates or polymethacrylates are described in many references, such as *Organic Polymer Chemistry*, by K. J. Saunders, Chapman and Hall, 1973; *The Condensed Chemical Dictionary*, 10th Edition, 1981, Van Nostrand Reinhold Company; and U.S. Pat. No. 4,563,393, all of which are incorporated herein by reference. Most of the suitable acrylics are derived from alkyl acrylates and alkyl methacrylates, wherein the alkyl group contains about 1 or 2 carbon atoms. Examples of the alkyl acrylates are methyl acrylate, ethyl acrylate, and the like, while examples of the alkyl methacrylates include methyl methacrylate, ethyl methacrylate, and the like.

Other types of acrylates are also suitable, such as those based on hydroxylalkyl esters of ethylenic unsaturated carboxylic acids, e.g., beta-hydroxyethyl acrylate or beta-hydroxyethyl methacrylate. Moreover, the acrylic material may include as a constituent at least one copolymerizable monomer. Examples include alkenyl compounds having an amide group (e.g., acrylamide), an n-methylol compound, and an ethylenic unsaturated carboxylic acid (e.g., acrylic acid, methacrylic acid, maleic acid, and the like). Other types of copolymerizable materials could also be used, e.g., polyfunctional monomers such as divinylbenzene.

Selection of a particular monomer composition upon which the acrylic material would be based depends on a variety of factors, such as the nature of the fluoride-based polymeric layer to be attached to the tie layer; the type of styrenic material being used in the tie layer copolymer; the level of adhesion required; the required flow characteristics for the copolymer; the miscibility of the various constituents with other constituents; the cost of the various monomeric constituents; and the extrudability-characteristics of the polymerized acrylic material.

Examples of the polyacrylates which may be used in some embodiments of the present invention are poly(methyl acrylate) and poly(ethyl acrylate). In many embodiments, poly(alkyl methacrylates) are especially preferred, e.g., poly(methyl methacrylate) and poly(ethyl methacrylate). Mixtures or copolymers based on any of these materials may also be employed.

In the most preferred embodiments, poly(methyl methacrylate) (PMMA) or poly(ethyl methacrylate) (PEMA) are the acrylic polymers of choice for the tie layer copolymer, with PMMA being especially preferred in some instances. All of the materials mentioned above are commercially available, or can be prepared by those skilled in the art without undue effort. For example, detailed descriptions of the preparation and use of the major acrylic raw materials (e.g., acrylic acid, methacrylic acid, esters of these acids, acrylonitrile, and acrylamide) are widely available.

The styrenic material of the tie layer can also be selected from a wide variety of materials, with the proviso that it is physically and chemically compatible with the polyphenylene ether-based material. As used herein, a "styrenic material" includes polymers in which styrene is the dominant component, i.e., comprising at least about 50% of the polymer by weight. The term is meant to embrace polymers based on styrene itself, as well as those based on related compounds, such as bromostyrene, chlorostyrene, alpha-methyl styrene, and para-methyl styrene. Mixtures of any of these monomers (sometimes with other monomers such as divinylbenzene) may also be used to form suitable styrenic polymers. Moreover, the styrenic material may be rubber-modified. Rubber-modified materials are discussed below in regard to flexibilizing agents for the present invention.

Selection of a particular styrenic material depends in part on many of the factors discussed above in regard to the acrylic material, e.g., cost, miscibility, and flow characteristics. In preferred embodiments, the styrenic material is homopolystyrene.

The weight ratio of the styrenic material to the acrylic material in the copolymer is generally in the range of about 20:80 to about 80:20. In preferred embodiments, though, the copolymer comprises at least about 40% by weight styrenic material. In some especially preferred embodiments, the copolymer comprises at least about 65% by weight styrenic material. The particular level of styrenic material selected will depend in part on the desired adhesion level for the tie layer. Other factors considered are material cost and the desired level of impact strength for the tie layer.

A variety of different types of copolymers can be used for the tie layer of the present invention. Copolymer types are described in many references, such as the Saunders text referenced previously. Most of these types of copolymers are characterized by the arrangement of structural units (here, acrylic units and styrenic units) in one or more polymer chains, which may be linear or branched. Thus, the copolymer may be random, alternating, block, or graft in structure. Variations of any of these types of copolymers may also be suitable for this invention. As but one example, radial teleblock copolymers based on the acrylic and styrenic blocks could be employed. (General techniques for preparing radial teleblock copolymers are described in various references, such as U.S. Pat. Nos. 4,097,550 and 3,281,383, both incorporated herein by reference). The use of mixtures of copolymers is also possible, e.g., a mixture of random copolymers. Those of ordinary skill in the polymer arts are familiar with the preparation of all of the above-mentioned copolymers.

In preferred embodiments, the copolymer is of the graft-type or block type (e.g., a linear diblock polymer based on acrylic units and styrenic units). In some especially preferred embodiments, graft copolymers are the choice for the present invention. Examples of these types of materials are provided below. Graft copolymers of polystyrene and a poly(alkyl methacrylate) like PMMA or PEMA are especially suitable for some tie layer applications.

Moreover, in some preferred embodiments, the polystyrene molecular weight in the copolymer should be in the range of about 15,000 to about 250,000, while the molecular weight of the acrylic-based material in some embodiments should preferably be in the range of about 5,000 to about 150,000. (Weight averages are used here). However, this guideline is not strict, as significant variation of these values can still yield very acceptable results for many embodiments.

In many of the preferred embodiments, the tie layer composition further comprises at least one flexibilizing agent which is compatible with either the fluoride-based polymeric material or the polyphenylene ether-based material. Various types of materials may be suitable for this purpose.

One type of flexibilizing agent which is usually very compatible with the polyphenylene ether-based material is a blend or copolymer which comprises rubber and polystyrene. Blends of this type are well-known in the art and described, for example, in U.S. Pat. Nos. 4,826,919 and 4,970,272, both incorporated herein by reference. These materials are often referred to as "high impact polystyrene" (HIPS) or "rubber-modified polystyrene". They usually contain from about 5% to about 25% by weight rubber. Typically, they are made by adding rubber during or after polymerization of the styrene, to produce an interpolymer of rubber and polystyrene or a physical admixture of the two components, depending on the particular process employed. Examples of the rubber component include butadiene, isoprene, chloroprene, ethylene-propylene, and ethylene-propylene-diene, with butadiene being most commonly used.

Copolymers of rubber and polystyrene are also well-known in the art, and described in references like U.S. Pat. No. 4,970,272. These materials are often "AB" diblocks or "ABA" triblocks, in which the "B" block, a diene, is hydrogenated, partially hydrogenated, or non-hydrogenated. Examples of the AB diblock copolymers are polystyrene-polybutadiene; polystyrene-polyisoprene, and poly(alpha-methylstyrene)-polybutadiene. Examples of the ABA triblock copolymers are polystyrene-polybutadiene-polystyrene (SBS); polystyrene-polyisoprene-polystyrene; poly(alpha-methylstyrene)-polybutadiene-poly(alpha-methylstyrene); and poly(alpha-methylstyrene)-polyisoprene-poly(alpha-methylstyrene). Commercial triblock copolymers are available under the Kraton D® and Kraton G® trade names, from Shell Chemical Company. Moreover, methods for preparing and selectively hydrogenating these materials are well-known. U.S. Pat. Nos. 3,078, 254; 3,149,182; 3,231,635; 3,402,159 (all of which are incorporated herein by reference) are non-limiting examples of references which are thought to be instructive in this regard.

Another type of flexibilizing agent which is very suitable for the present invention is a core-shell polymer. These types of polymers are known in the art. Core-shell materials in which the shell is acrylic-based or contains at least some acrylic material are especially desirable, since they appear to exhibit some compatibility with the acrylic material in the tie layer composition, and with the fluoride-based material of one of the layers adjacent the tie layer. Core-shell polymers and methods for preparing them are generally described in many references, such as U.S. Pat. Nos. 5,457, 156; 5,399,621; 5,346,953; 5,332,782; 5,290,858; 4,970, 272; 4,292,233; 4,180,494; 4,096,202; 4,034,103; 3,808, 180; 3,787,522; and 3,489,699.

Many of the core-shell polymers which are suitable for the present invention are based on a core of a first polymer surrounded by one or more shells, or layers, of another polymer. The overall material is typically formed by multi-stage polymerization, such that the shell or shells are bonded to the core and/or to adjacent shells. The core is usually from about 50 to about 90 weight % of a rubbery material. An example of such a material is a conjugated diolefin polymer, e.g., a polymer based on butadiene, isoprene, chloroprene, or dimethylbutadiene. The core can also include other materials. For example, the diolefin could be copolymerized with an alkyl acrylate such as butyl acrylate. The core could alternatively be based on other elastomeric substances, such as silicone rubbers. Alternatively, the core could comprise about 50 to about 95% lower alkyl acrylate, which could be copolymerized with a lower alkyl methacrylate, or with styrene or a similar material. In general, the core is a rubbery composition having a low glass-transition temperature, e.g., below about −20° C.

The shell (or shells) in these types of copolymers is preferably an acrylic-based shell formed of a copolymer of acrylonitrile or methacrylonitrile, or of an alkyl acrylate or methacrylate, wherein the alkyl group has about 1–8 carbon atoms. (In some less preferred embodiments, the shells could be formed of a copolymer of styrenic monomers). As described in U.S. Pat. No. 5,457,156, the shell could include minor amounts of other copolymerized monomers, such as those based on unsaturated carboxylic acids or anhydrides (e.g., acrylic acid or acrylic acid). Techniques for polymerizing the core polymer (e.g., using a "seed" polymer) are also described in the references, as are methods for grafting the shell polymers to the core. Exemplary core-shell polymers have been available commercially from Rohm and Haas Company under the trade names KM-611, KM-653, KM-330, EXL 2650, and EXL 2691.

Various other types of core-shell polymers may be useful as the flexibilizing agent. For some embodiments of this invention, core-shell polymers having a cross-linked acrylate core which is surrounded and interpenetrated by a cross-linked styrene shell may by employed. Materials of this type are described in U.S. Pat. Nos. 4,970,272; 4,731, 414; 4,684,696; and 3,944,631; all incorporated herein by reference. Some of these types of polymers are available from GE Plastics as GELOY® resin products.

Moreover, other types of materials may be used as the flexibilizing agent for the tie layer composition, alone or in combination with one or more of the materials mentioned above. For example, it may be possible to use polyolefins or olefin-based copolymers, such as low- and high-density polyethylene, ethylene-propylene copolymers, and the like. Acrylonitrile-butadiene-styrene (ABS) copolymers could also be effective in some instances, as could polyurethane rubbers, polyether rubbers (e.g., polypropylene oxide), and thermoplastic polyester elastomers.

In many preferred embodiments, a core-shell polymer is the preferred flexibilizing agent for use in the tie layer composition—especially one which is itself a graft copolymer having a predominately rubbery core (e.g., conjugated diene), with one or more shells derived from acrylic-type monomers, alone or in combination with other vinyl monomers. In other preferred embodiments, the preferred flexibilizing agent is high-impact polystyrene, or any type of styrene-rubber block copolymer, e.g., a styrene-butadiene block copolymer.

However, in especially preferred embodiments of the present invention, the flexibilizing agent comprises a combination of a core-shell polymer and either a styrene-rubber blend (such as high-impact polystyrene) or a styrene-rubber block copolymer. The ratio of the core-shell polymer to the styrene-rubber blend or copolymer is usually in the range of about 20:80 to about 80:20. In preferred embodiments, this flexibilizing agent composition comprises at least about 25% by weight of the styrene-rubber blend or copolymer, while in some especially preferred embodiments, the flexibilizing agent comprises at least about 40 % by weight of the styrene-rubber blend or copolymer.

The amount of flexibilizing agent to be used in the tie layer composition will depend in part on the adhesion requirements for the particular article being manufactured. The examples which follow provide some guidance as to the effect of flexibilizing agent type and level on adhesion characteristics. In general, the flexibilizing agent improves the adhesion capability of the tie layer, while also sometimes lowering the cost of the tie layer composition. Use of the flexibilizing agent can also toughen the tie layer, thereby minimizing the incidence of brittle fracture, as described in the examples.

In most embodiments, the tie layer contains at least about 10% by weight flexibilizing agent. In preferred embodiments, the tie layer contains at least about 25% by weight flexibilizing agent. In some especially preferred embodiments, the tie layer comprises at least about 45% by weight flexibilizing agent. Those skilled in the art will be able to select the most appropriate level of flexibilizing agent for a given application, based on the teachings herein.

The tie layer composition can further contain other components which may be appropriate in some circumstances. For example, the tie layer could contain flow additives, flame retardants, light stabilizers, fillers, viscosity-control agents (e.g., thickeners), pigments, and the like. These components would of course be employed in effective amounts, which would depend in part on the characteristics and property-requirements of the adjacent layers.

The tie layer should be as thin as possible (e.g., less than about 1 mil thick), especially when the tie layer composition does not contain a flexibilizing agent. When being extruded, it is usually quite difficult to form a layer which is considerably less than about 1 mil in thickness. Thicker tie layers—e.g., about 2 to about 5 mils—are of course possible for some embodiments.

As mentioned previously, one surface of the tie layer is attached to either a polystyrene-based material or a polyphenylene ether-based material. Polystyrene-based materials are well-known in the art, and described in many references, such as the K. J. Saunders text referenced above, or *The Condensed Chemical Dictionary*, also referred to earlier. All of the styrenic materials described earlier may fall within the scope of "polystyrenebased materials". The term is meant to embrace homopolymers like polystyrene, alone or in combination with copolymers, like styrene-acrylonitrile, acrylonitrile-butadiene-styrene, and styrene-alpha-methylstyrene. Expanded polystyrene (i.e., foam materials) are also included herein. Preparation techniques for these materials are very familiar to those skilled in the art.

The polyphenylene ether-based materials are sometimes referred to as "polyphenylene oxides". They are well-known in the art and described in many references, such as the Saunders text mentioned above; and U.S. Pat Nos. 4,970,272; 4,957,966; 4,956,497; 4,956,422; 4,826,919; 4,684,696; 4,097,550; 3,306,875; and 3,306,874, all of which are incorporated herein by reference.

For brevity, the term "polyphenylene ether" as used throughout this specification and the appended claims will include not only unsubstituted polyphenylene ether (made from phenol) but also polyphenylene ethers substituted with various substituents. The term also includes polyphenylene ether copolymers, graft copolymers and block copolymers, particularly graft copolymers of alkenyl aromatic compounds, especially vinlyl aromatic compounds, and a polyphenylene ether.

Suitable phenol compounds for the preparation of the polyphenylene ethers may be represented by the general formula:

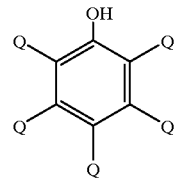

wherein Q is a monovalent substituent individually selected from the group consisting of hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

As specific examples of the phenol compound represented by the above formula, there may be given phenol; o-, m- and p- cresols; 2,6-, 2,5-, 2,4- and 3,5-dimethyiphenols; 2-methyl-6-phenyl-phenol; 2,6-diphenylphenol; 2,6-diethylphenol; 2-methyl-6-ethylphenol; and 2,3,5-, 2,3,6- and 2,4,6-trimethylphenols. Two or more phenol compounds may be used in combination should copolymers be desired. Additionally, copolyphenylene ethers may also be prepared from a phenol compound of the above general formula with a phenol compound not represented by the above general formula including, for example, a dihydric phenol such as bisphenol-A, tetrabromobisphenol-A, resorcinol or hydroquinione.

Illustrative of suitable polyphenylene ethers there may be given, for example, poly(2,6-dimethyl-1,4-phenylene)ether; poly(2-methyl-1,4-phenylene)ether, poly(3-methyl-1,4-phenylene)ether; poly(2,6-diethyl-1,4-phenylene)ether; poly (2-methyl-6-allyl-1,4-phenylene)ether; poly(2,6-dichloromethyl-1,4-phenylene)ether; poly(2,3,6-trimethyl-1,4-phenylene) ether; poly(2,3,5,6-tetramethyl-1,4-phenylene)ether; poly(2,6-dichloro-1,4-phenylene)ether; poly(2,6-diphenyl-1,4phenylene)ether; poly(2,5-dimethyl-1,4-phenylene)ether and the like.

Preferred polyphenylene ethers will have the formula:

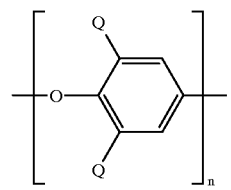

where Q is as defmed above and n is at least 50, preferably from about 50 to about 200. Examples of polyphenylene ethers corresponding to the above formula can be found in the above referenced patents and include, among others: poly(2,6-dilauryl-1,4-phenylene)ether, poly(2,6-diphenyl-1,4-phenylene)ether; poly(2,6- dimethoxy-1,4-phenylene)ether; poly(2,6-diethoxy-1,4-phenylene)ether; poly(2-methoxy-6-ethyoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether, poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

For the purpose of the present invention, an especially preferred family of polyphenylene ethers include those having a $C_1$ to $C_4$ alkyl substitution in the two positions ortho to the oxygen ether atom. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2,6-dipropyl-1,4-phenylene)ether; poly(2-ethyl-6-propyl-1,4-phenylene)ether; and the like. Most often, the polyphenylene ether will comprise units derived from 2,6-dimethyl phenol, or a combination of units derived from 2,6-dimethylphenol and 2,3,6-trimethyl phenol.

The polyphenylene ether resins may be utilized alone or in combination with alkenyl aromatic resins such as polystyrene—especially the rubber-modified polystyrene (HIPS) described above. The weight ratio of polyphenylene ether to alkenyl aromatic component could range from about 95:5 to about 5:95. Commercial examples of polyphenylene ether/polystyrene blends include the NORYL® resin products, available from GE Plastics. The blends can contain a wide variety of other components, in amounts effective for an intended purpose. Non-limiting examples include flame retardants, modifier resins such as the styrene/butadiene block copolymers discussed above; fillers, reinforcing agents, pigments, other colorants, various stabilizers, and plasticizers. Techniques for blending the various components and molding the polyphenylene ether product are also well-known in the art and described in some of the references cited above.

The thickness of the layer of the polystyrene or polyphenylene ether-based material will of course depend on the end use of articles made therefrom. Usually, the layer would have a thickness in the range of about 40 mils to about 200 mils, and preferably, in the range of about 50 mils to about 80 mils.

Another surface of the tie layer is attached to a layer of a fluoride-based polymeric material, as pointed out previously. Fluoride-based polymers (i.e., fluoropolymers) are known in the art and described, for example, in the Saunders text mentioned above. They are frequently based on raw materials such as one or more of the following: tetrafluoroethylene, chlorotrifluoroethylene, vinyl fluoride, vinylidene fluoride, hexafluoropropylene, trifluoronitrosomethane, and the like, alone or in combination with other raw materials. Non-limiting examples include polytetrafluoroethylene, poly(vinyl fluoride), poly(vinylidene fluoride), tetrafluoroethylene-hexafluoropropylene copolymers, vinylidene fluoride-hexafluoropropylene copolymers; vinylidene fluoride-chlorotrifluoroethylene copolymers, fluoronitroso polymers, polyfluoroprene, fluoroacrylate polymers, and fluorosilicones.

In many preferred embodiments, the fluoride-based polymeric material comprises poly(vinylidene fluoride) (PVDF). This material provides good weatherability characteristics when serving as a cap layer for a polyphenylene ether-based polymer. This type of material is known in the art and described, for example, in U.S. Pat. Nos. 4,818,786; 3,031,437; and 2,435,537, all incorporated herein by reference. Homopolymers of vinylidene fluoride may be employed, as could copolymers with minor amounts of other fluorinated monomeric moieties, such as those mentioned above.

When poly(vinylidene fluoride) or a related copolymer is employed, it may be used in conjunction with at least one other component, such as a compatible alkyl acrylate resin or alkyl methacrylate resin (e.g., PMMA or PEMA), or a hexafluoropropylene-based resin. The exact proportion of each component will be determined by a number of factors, such as weatherability requirements, material compatibility, flow characteristics, and cost. Some exemplary compositions comprise about 40% by weight to about 80% by weight poly(vinylidene fluoride) and about 60% by weight to about 20% by weight hexafluoropropylene. Other exemplary compositions comprise about 40% by weight to about 80% by weight poly(vinylidene fluoride) and about 60% by weight to about 20% by weight of an alkyl acrylate or alkyl methacrylate resin. Yet another category of exemplary compositions comprise about 40% by weight to about 60% by weight poly(vinylidene fluoride); about 20% by weight to about 40% by weight hexafluoropropylene; and about 10% by weight to about 30% by weight of an alkyl acrylate or alkyl methacrylate resin. (It should be understood that in each instance, the fluoride-based compositions might additionally contain effective amounts of a variety of conventional additives, while retaining the general proportions of primary components illustrated above).

The thickness of the fluoride-based polymeric material will depend on its intended use. When it is being used as a cap layer to protect a thermoplastic material like polyphenylene ether from the effects of UV light, a layer thickness in the range of about 0.1 mil to about 4 mils is preferred. The most appropriate thickness will depend in part on the amount of UV absorber included in the cap layer. Making the layer as thin as possible can help to reduce material costs. However, thicker layers within the approximate range mentioned above are sometimes preferred, e.g. when the article is to be subjected to an operation such as thermoformning, which may cause thinning of the cap layer, and subsequent degradation, along the edges of the article. Moreover, if the fluoride-based polymer layer were being used for some purpose other than weatherability, it could of course be considerably thicker, depending on the intended use.

Various techniques are available for providing a tie layer between the polystyrene or PPE-based layer and the fluoride-based layer. Those skilled in disciplines such as chemical engineering are well-acquainted with these techniques. As one example, the tie layer and the fluoride-based layer could be sequentially cast onto the PPE or polystyrene layer from appropriate solvents.

Various lamination techniques may also be utilized; they are generally well-known in the art. For example, films of each of the layers of the present invention (e.g., films made by extrusion or solvent-casting) could be laid on top of each other in the proper sequence, and then heated. As another example, a film of the fluoride-based polymer with the tie layer applied to one side could first be prepared, and this layer could then be laid down on top of a base layer of the polystyrene or PPE-type material, followed by an appropriate heat treatment.

Coextrusion techniques are also very useful for preparing the multi-layer article described herein. A multitude of references provide suitable instruction regarding coextrusion, e.g., see *Plastics Extrusion Technology*, edited by F. Hensen, Hanser Publishers, 1988. The particular type of coextrusion employed (for example, blown film or cast film) will depend in part on the nature of the article being formed. References such as the Hensen text also provide a description of special aspects of coextrusion which depend on the physical nature and the chemical nature of polymeric materials which may be employed.

Other finishing techniques may be employed after the preparation of the multi-layer article. Examples include additional heat-treatment of the article, compression-molding, thermoforming, and the like. These techniques are familiar to those skilled in the art.

It should be apparent from this discussion that another aspect of the present invention relates to a method for improving the adhesion of a fluoride-based polymer layer to either a polystyrene-based or polyphenylene ether-based polymer layer. The method comprises applying a tie layer between the two primary layers, wherein the tie layer comprises a copolymer of a styrenic material like high impact polystyrene, and an acrylic material such as poly (methyl methacrylate) (PMMA), as set forth previously. The tie layer composition often contains at least one of the flexibilizing agents, which is compatible with the fluoride-based polymeric material or the polystyrene or PPE-based material. The tie layer could be applied to either of the other layers (e.g., by solvent-casting), prior to the joining of the other layers. In preferred embodiments, the three layers are coextruded or laminated together by conventional techniques.

It should also be apparent that another embodiment of the present invention is directed to an article which comprises:
a) a fluoride-based polymer layer;
b) a polystyrene -based or polyphenylene ether-based polymer layer; and
c) a tie layer disposed between layer (a) and layer (b).

Layer (c) comprises a copolymer of a styrenic material and an acrylic material, as outlined above, and in preferred embodiments, contains at least one of the flexibilizing agents, such as a core-shell material, alone or in combination with the styrene/rubber material. Most often, layer (a) is a relatively thin cap layer which is attached to layer (b) by the tie layer, to afford a measure of weatherability in an outside environment.

EXAMPLES

These examples are merely illustrative, and should not be construed to be any sort of limitation on the scope of the claimed invention.

With the exception of control sample 1 (described below) and sample 2 (which utilized crushed granules of the tie layer material), all of the adhesion tests were performed by drawing a 1–5 mil wet film in a solvent solution of the tie layer onto NORYL® resin substrates. For samples 3, 5–7, and 9–23, the solvent solution was 10% toluene. For sample 4, the toluene concentration was 25%, while a 10% solution of N-methyl-pyrrolidone was used in sample 8. Each film was then dried for 30 minutes at 70° C. The poly(vinylidene fluoride) (PVDF) film samples were then compression-molded onto the sandwich for 30 minutes at 300° F. and 10 psi. Several tests were performed, to show that the solvent does not provide a biased result in the adhesion evaluation. Final tie layer thicknesses were approximately 0.1 mil. A Nylon® backing was used in the peel test to provide strength to the PVDF. Addition of this backing did not influence the adhesion values.

The NORYL® resin material used in the examples was based on a blend of about 65% by weight polyphenylene ether and 35% by weight high impact polystyrene (HIPS). The HIPS itself was a mixture of about 30% by weight polystyrene and about 70% by weight styrene-butadiene rubber, with a molecular weight of about 320,000. The NORYL® resin material also contained minor amounts of stabilizers and fillers, along with approximately 13.5% of a liquid flame retardant, based on a mixture of aromatic phosphates. The flame retardant helps to improve processing of the resin.

The cap layer used in the examples was a blend of a PVDF-hexafluoropropylene copolymer, with poly(methyl methacrylate). It should be noted that other types of fluoride-based polymers were also tested (e.g., a homopolymer of PVDF (KYNAR® 740), as well as a commercial PVDF-hexafluoropropylene copolymer by itself), yielding substantially the same results as demonstrated here. In general, many suitable PVDF-type polymers have a glass transition temperature of about −40° C.; a melting point of about 170° C., and a decomposition temperature of about 380° C.

The adhesion characteristics were determined according to ASTM S3167-93, using a 0.5 inch-wide, 3 inch-long peel segment, at a peel rate of 10 inches/min.

For samples 6 and 7, the tie layer was first solvent-cast onto the layer of PVDF, followed by heating and removal of the solvent. This film was then laid on top of a NORYL® resin base layer, with the tie layer adjacent the base layer surface. The multi-layer structure was then heat-treated. These particular tests demonstrated that the solvent was not affecting the adhesion characteristics.

As shown in the table, the tie layer was solvent-cast directly onto the NORYL® resin base layer in most of the other tests. For sample 8, however, a HIPS/PVDF trial composition was first solvent-cast onto stainless steel. The film was then removed from the steel, dried, and then laid on top of a NORYL® resin base layer. A layer of PVDF was then laid on top of the HIPS/PVDF layer, and all of the layers were heat-pressed together.

With reference to Table 1, sample 1 was a control, obtained from Avery Dennison as a commercial cap layer material for thermoplastic sheets like those made of NORYL® resin. It is believed to be an acrylic-based, multi-layer material, in which the layer closest to the NORYL® resin substrate contains a heat-activated catalyst to improve adhesion to the substrate.

The adhesion level at a measured failure point was characterized as "cohesive" failure or "adhesive" failure. A cohesive-type failure is usually more desirable. In that instance, failure occurs within the tie layer itself. In contrast, adhesive failure, in which failure occurs between the tie layer and one of the adjacent layers, is not quite as desirable.

"Brittle fracture" is evidenced by non-uniform peel in the adhesion test. It is generally an undesirable result when the end product is to be used in an environment which requires that the article have good impact strength and/or good flexural characteristics.

Table 1 provides results for a variety of samples based on the teachings herein:

TABLE 1

Adhesion Characteristics for Various Copolymer-Based Tie-Layers

| sample No. | Tie Layer Type[a] | Ratio[b] | Tie-layer Thickness(mil) | Cast onto[c] | Failure Mode[d] | Adhesion (peel str, lb/in) |
|---|---|---|---|---|---|---|
| 1 | Control | 100 | NA | PPE/HIPS | A | 3.5 |
| 2 | PS-g-PMMA | 100 | 30 | SMA/PPE/HIPS | C, B | 2.1 |
| 3 | PS-g-PMMA | 100 | 2 | PPE/HIPS | C, B | 6.8 |
| 4 | PS-g-PMMA | 100 | 2 × 2 | PPE/HIPS | C, B | 5.5 |
| 5 | PS-g-PMMA | 100 | 2 | PVDF | C, B | 9.6 |
| 6 | HIPS/PMMA/PS-g-PMMA | 25/25/50 | 1 | PVDF | C, B | 13 |
| 7 | HIPS/PMMA/PS-g-PMMA | 25/25/50 | 2 | PVDF | C, B | 14 |
| 8 | HIPS/PVDF | 50/50 | 2 | Steel | A | 0.0 |
| 9 | HIPS/CSIM | 50/50 | 2 | PPE/HIPS | A | 0.4 |
| 10 | HIPS/CSIM/PS-g-PMMA | 25/25/50 | 1 | PPE/HIPS | C | 34 |
| 11 | HIPS/CSIM/PS-g-PMMA | 25/25/50 | 2 | PPE/HIPS | C | 24 |
| 12 | HIPS/CSIM/PS-g-PMMA | 25/25/50 | 5 | PPE/HIPS | C | 31 |
| 13 | HIPS/CSIM/PS-g-PMMA | 25/25/50 | 10 | PPE/HIPS | C | 39 |
| 14 | HIPS/CSIM/PS-g-PMMA | 40/40/20 | 1 | PPE/HIPS | C | 52 |
| 15 | HIPS/CSIM/PS-g-PMMA | 45/45/10 | 1 | PPE/HIPS | C | 17 |
| 16 | HIPS/CSIM/PS-ran-PMMA | 25/25/50 | 2 | PPE/HIPS | C | 1.7 |
| 17 | Ran/Ran (70/30; 40/60) | 50/50 | 2 | PPE/HIPS | A, C | 7.7 |
| 18 | Ran/Ran/HIPS/CSIM | 25/25/25/25 | 2 | PPE/HIPS | A, C | 5.9 |
| 19 | HIPS/CSIM/PS-b-PMMA | 45/45/10 | 2 | PPE/HIPS | A | 8.7 |
| 20 | HIPS/CSIM/PS-b-PMMA | 40/40/20 | 2 | PPE/HIPS | A | 13 |
| 21 | HIPS/CSIM/PS-b-PMMA | 33/33/33 | 2 | PPE/HIPS | C | 21 |
| 22 | HIPS/CSIM/PS-b-PMMA | 25/25/50 | 2 | PPE/HIPS | C | 22 |
| 23 | PS-b-PMMA | 100 | 2 | PPE/HIPS | C | 45 |

[a]PS = polystyrene; PMMA = poly(methyl methacrylate); HIPS = high impact polystyrene; PVDF = poly(vinylidene fluoride)-based copolymer, as described previously; CSIM = core/shell impact modifier; "g" = graft copolymer; "ran" = random copolymer; "b" = block copolymer;
[b]Ratio, by weight, of the components.
[c]SMA = styrene maleic anhydride (blended with NORYL ® resin); "Cast Onto" is the substrate used when making the tie layer.
[d]Key: A = adhesive; a = mostly adhesive; C = cohesive; c = mostly cohesive; B = brittle fracture Samples 3–5, in which the tie layers are based on graft copolymers of polystyrene and PMMA, without any flexibilizing agent, exhibited adhesion values which were considerably better than control sample 1. (Sample 2, in which the tie layer composition was deposited in powder form, did not exhibit good adhesion, apparently because of the particulate-like deposition, which was not a good surface for enhancing uniform adhesion).

While the failure mechanism for samples 2–6 was highly cohesive, it was also quite brttle, indicating that the copolymer forming the tie layer had little mechanical integrity in the neat state.

Samples 6–7, in which the tie layer composition included HIPS as the flexibilizing agent, showed considerably improved adhesion as compared to samples 2–5, although the failure mechanism, while cohesive, was still brittle to some extent. These materials would be suitable for use in some end use applications which do not require high impact strength and/or good flexural characteristics.

Sample 8 utilized a HIPS/PVDF blend as the tie layer (outside the scope of this invention), which was initially cast onto steel. Adhesion was practically nonexistent, with no compatibility between the HIPS and the PVDF. It is expected that the same result would have been evident, regardless of the type of substrate upon which the tie layer was cast.

Sample 9 simply involved a trial of a combination of HIPS and a core/shell material (CSIM) as the tie layer composition itself, and is also outside the scope of this invention. The CSIM was a butadiene/methacrylate-type impact modifier available from Rohm & Haas as EXL 2650. The peel strength value was very low.

Samples 10–15, which utilized a HIPS/CSIM flexibilizing agent in conjunction with the graft copolymer of polystyrene and PMMA as the tie layer, generally exhibited very high peel strength values on the PPE/HIPS-type substrate (NORYL® resin). The cohesive failure mode was also a very desirable result.

Sample 16 utilized a random copolymer of polystyrene and PMMA in conjunction with the flexibilizing agent as the tie layer composition. Although this tie layer was within the scope of the present invention, the adhesion value was quite low. However, the cohesive failure mode was very desirable. Moreover, it is expected that adjustments in the polymer chain architecture would improve the adhesion value, e.g., increasing the average sequence length distribution.

The tie layer of sample 17 utilized a mixture of random copolymers of polystyrene and PMMA, with varying percentages of each monomer, while the tie layer of sample 18 was based on the same composition, but with the addition of the HIPS/CSIM flexibilizing agent. In both instances, the peel strength value was acceptable. The failure mode (adhesive but somewhat cohesive) was also acceptable for some end use applications.

Samples 19–22 utilized a tie layer composition based on a block copolymer of the polystyrene and PMMA, in conjunction with the HIPS and the CSIM. The relative proportions of each component were varied in these samples. Peel strength values ranged from good to excellent, and samples 21–22 also exhibited a cohesive failure mode.

For sample 23, a tie layer based on a polystyrene/PMMA block copolymer by itself yielded a very high peel strength value, and a cohesive failure mode.

FIG. 1 provides a graphical representation of adhesion (peel strength) values for the graft-copolymer-based tie layer, using a 50/50 weight blend of HIPS and CSIM. The adhesion was maximized by utilizing a combination of the graft copolymer, HIPS, and CSIM in the ratio of 20/40/40, respectively, although many of the other combinations yielded acceptable results.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

All of the patents, articles, and texts mentioned above are incorporated herein by reference.

What is claimed is:

1. A tie layer adhering a first layer comprising a fluoropolymer to a second layer comprising a polyphenylene ether, the tie layer comprising:
   a copolymer consisting of a polymerization product of
   (a) a styrenic material selected from the group consisting of styrene and homopolystyrene; and
   (b) an acrylic material selected from the group consisting of methyl acrylate; ethyl acrylate; methyl methacrylate; ethyl methacrylate; beta-hydroxyethyl acrylate; beta-hydroxyethyl methacrylate; polymers consisting of a polymerization product of at least one of the foregoing monomers; and polymers consisting of a polymerization product of at least one of the foregoing monomers and in addition at least one co-polymerizable monomer selected from the group consisting of acrylamide, acrylic acid, methacrylic acid, maleic acid, and divinylbenzene; wherein the acrylic material is compatible with the fluoropolymer.

2. The tie layer of claim 1, wherein the acrylic material is selected from the group consisting of methyl acrylate, ethyl acrylate, methyl methacrylate, ethyl methacrylate, and polymers consisting of a polymerization product of at least one of the foregoing monomers.

3. The tie layer of claim 1, wherein the weight ratio of the styrenic material to the acrylic material in the copolymer is in the range of about 20:80 to about 80:20.

4. The tie layer of claim 3, wherein the copolymer comprises at least 40% by weight styrenic material.

5. The tie layer of claim 4, wherein the copolymer comprises at least 65% by weight styrenic material.

6. The tie layer of claim 1, wherein the copolymer is a graft copolymer.

7. The tie layer of claim 1, comprising a mixture of random copolymers of the styrenic material and the acrylic material.

8. The tie layer of claim 1, furher comprising poly(methyl methacrylate).

9. The tie layer of claim 1, wherein the copolymer is a block copolymer.

10. An article, comprising:
    a) a fluoride-based polymer layer comprising at least one polymer selected from the group consisting of polytetrafluoroethylene, poly(vinyl fluoride), poly(vinylidene fluoride), tetrafluoroethylene-hexafluoropropylene copolymers, vinylidene-fluoride-chlorotrifluoroethylene copolymers, fluoronitroso polymers, polyfluoroprene, fluoroacrylate polymers, and fluorosilicone;
    b) a polyphenylene ether-based polymer layer comprising the oxidation polymerization product of at least one phenol compound represented by the general formula

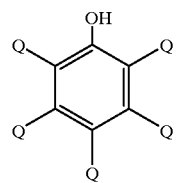

wherein each Q is a monovalent substituent individually selected from the group consisting of hydrogen, halogen, aliphatic and aromatic hydrocarbon and hydrocarbonoxy radicals free of a tertiary alpha-carbon atom, and halohydrocarbon and halohydrocarbonoxy radicals free of a tertiary alpha-carbon atom and having at least two carbon atoms between the halogen atom and the phenyl nucleus, and wherein at least one Q is hydrogen; and c) a tie layer disposed between layer (a) and layer (b), wherein the tie layer comprises a copolymer consisting of a polymerization product of
   (a) a styrenic material selected from the group consisting of styrene and homopolystyrene; and
   (b) an acrylic material selected from the group consisting of methyl acrylate; ethyl acrylate; methyl methacrylate; ethyl methacrylate, beta-hydroxyethyl acrylate; beta-hydroxvethyl metacrylate; polymers consisting of a polymerization product of at least one of the foregoing monomers; and polymers consisting of a polymerization product of at least one of the foregoing monomers and in addition at least one co-polmerizable monomer selected from the group consisting of acrylamide, acrylic acid, methacrylic acid, maleic acid, and divinylbenzene; wherein the acrylic material is compatible with the fluoride-based polymeric material.

11. The article of claim 10, further comprising at least one flexibilizing agent which is compatible with the fluoride-based polymeric material or the ployphenylene ether-based material.

12. The article of claim 11, wherein the flexibilizing agent is a blend or copolymer which comprises rubber and polystyrene.

13. The article of claim 12, wherein the flexibilizing agent is selected from the group consisting of high impact polystyrene and block copolymers based on polystyrene and diene rubbers.

14. The article of claim 11, wherein the flexibilizing agent is a core-shell polymer.

15. The article of claim 14, wherein the core of the flexibilizing agent comprises a rubbery material.

16. The article of claim 11, wherein the flexibilizing agent comprises a combination of a core-shell polymer and a styrene-rubber blend or copolymer.

17. The article of claim 16, wherein the shell of the core-shell polymer is acrylic-based.

18. The article of claim 16, wherein the weight ratio of the core-shell polymer to the styrene-rubber blend or copolymer for the flexibilizing agent is in the range of about 20:80 to about 80:20.

19. The article of claim 18, wherein the flexibilizing agent composition comprises at least 65% by weight of the styrene-rubber blend or copolymer.

20. The article of claim 11, comprising at least 10% by weight of the flexibilizing agent.

21. The article of claim 20, comprising at least 25% by weight of the flexibilizing agent.

22. The article of claim 10, wherein the polyphenylene ether-based polymer layer comprises polyphenylene ether and high impact polystyrene.

23. The article of claim 10, wherein the fluoride-based polymer laer comprises poly(vinylidene fluoride).

24. The article of claim 23, wherein the fluoride-based polymer layer further comprises at least one compatible component selected from the group consisting of alkyl acrylate resins, alkyl methacrylate resins, and hexafluoropropylene resins.

25. The article of claim 10, wherein the tie layer composition further comprises at least one flexibilizing agent.

26. The article of claim 25, wherein the flexibilizing agent is selected from the group consisting of a core-shell polymer, a styrene/rubber blend or copolymer, and a combination of a core-shell-polymer and a styrene/rubber blend or copolymer.

27. The article of claim 10, wherein the copolymer of the tie layer comprises at least 40% by weight styrenic material.

28. The invention of claim 10, wherein the article is selected from the group consisting of roofing panels, shingles, and canopies.

29. A method for adhering a first layer of a fluoride-based polymer to a second layer of a polyphenylene ether-based polymer or a polystyrene-based polymer, said method comprising:

situating a tie layer between the first layer and the second layer, wherein the tie layer comprises a copolymer consisting of a polymerization product of
(a) a styrenic material selected from the group consisting of styrene and homopolystyrene; and
(b) an acrylic material selected from the group consisting of methyl acrylate; ethyl acrylate; methyl methacrylate; ethyl methacrylate; beta-hydroxmethyl acrylate; beta-hdroxyethyl methacrylate; polymers consisting of a polymerization product of at least one of the foregoing acrylic materials; and polymers consisting of a polymerization product of at least one of the foregoing acrylic materials and in addition at least one co-polymerizable monomer selected from the goup consisting of acrylamide, acrylic acid, methacrylic acid, maleic acid, and divinylbenzene; wherein the acrylic material is compatible with the fluoride-based polymeric material;

wherein the fluoride-based polymeric material comprises at least one polymer selected from the group consisting of polytetrafluoroethylene, poly(vinyl fluoride), poly (vinylidene fluoride), tetrafluoroethylene-hexafluoropropylene copolymers, vinylidene-fluoride-chlorotrifluoroethylene copolymers, fluoronitroso polymers, polyfluoroprene, fluoroacrylate polymers, and fluorosilicones; wherein the polystyrene-based material is selected from the group consisting of homopolystyrene, styrene-acrylonitrile copolymers, acrylonitrile-butadiene-styrene copolymers, and styrene-alpha-methylstyrene copolymers; and wherein the polyphenylene ether-based material comprises the oxidation polymerization product of at least one phenol compound represented by the general formula

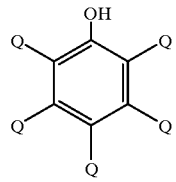

wherein each Q is a monovalent substituent individually selected from the group consisting of hydrogen, halogen, aliphatic and aromatic hydrocarbon and hydrocarbonoxy radicals free of a tertiary alpha-carbon atom, and halohydrocarbon and halohydrocarbonoxy radicals free of a tertiary alpha-carbon atom and having at least two carbon atoms between the halogen atom and the phenol nucleus and wherein at least one Q is hydrogen.

30. The method of claim 29, wherein the tie layer composition further comprises at least one flexibilizing agent.

31. The method of claim 29, wherein the tie layer is situated between the first layer and the second layer by a technique selected from the group consisting of solvent casting, coextrusion, and lamination.

32. An article, comprising:
a) a fluoride-based polymer layer comprising at least one polymer selected from the group consisting of polytetrafluoroethylene, poly(vinyl fluoride), poly (vinylidene fluoride), tetrafluoroethylene-hexafluoropropylene copolymers, vinylidene-fluoride-chlorotrifluoroethylene copolymers, fluoronitroso polymers, polyfluoroprene, fluoroacrylate polymers, and fluorosilicone;

b) a polystyrene-based polymer layer comprising a polystyrene-based material selected from the group consisting of homopolystyrene, styrene-acrylonitrile copolymers, acrylonitrile-butadiene-styrene copolymers, and styrene-alpha-methylstyrene copolymers; and c) a tie layer disposed between layer (a) and layer (b), wherein the tie layer comprises a copolymer consisting of a polymerization product of
(1) a styrenic material selected from the group consisting of styrene and homopolystyrene; and (2) an acrylic material selected from the group consisting of methyl acrylate; ethyl acrylate; methyl methacrylate; ethyl methacrylate; beta-hydroxyethyl acrylate; beta-hydroxyethyl methacrylate; polymers consisting of a polymerization product of at least one of the foregoing monomers; and polymers consisting of a polymerization product of at least one of the foregoing monomers and in addition at least one co-polymerizable monomer selected from the group consisting of acrylamide, acrylic acid, methacrylic acid, maleic acid, and divinylbenzene; wherein the acrylic material is compatible with the fluoride-based polymeric material.

33. The article of claim 32, wherein the polystyrene-based polymer layer comprises at least one material selected from the group consisting of polystyrene homopolymers, high impact polystyrene, styrene-rubber copolymers, styrene-acrylonitrile copolymers, acrylonitrile-butadiene-styrene copolymers, styrene-alpha-methylstyrene copolymers, polystyrene foam, and blends which comprise any of the foregoing materials.

34. The article of claim 32, wherein the tie layer further comprises at least one flexibilizing agent compatible with the fluoride-based polymeric material or the polystyrene-based material.

* * * * *